United States Patent [19]

Yamashita

[11] Patent Number: 4,989,033
[45] Date of Patent: Jan. 29, 1991

[54] PROCESS CAMERA

[75] Inventor: Miyuki Yamashita, Tokyo, Japan

[73] Assignee: Hirakawa Kogyosha Co., Ltd., Tokyo, Japan

[21] Appl. No.: 430,586

[22] Filed: Nov. 1, 1989

[30] Foreign Application Priority Data

Nov. 1, 1988 [JP] Japan .................................. 63-276834
Dec. 9, 1988 [JP] Japan .................................. 63-311418

[51] Int. Cl.⁵ ...................... G03B 27/52; G03B 27/58; G03B 27/70
[52] U.S. Cl. ...................................... 355/43; 355/44; 355/45; 355/66; 355/74; 355/55
[58] Field of Search ...................... 355/43, 44, 45, 66, 355/74, 18, 55

[56] References Cited

U.S. PATENT DOCUMENTS

| | | |
|---|---|---|
| 3,632,204 | 1/1972 | Friedel .................................. 355/66 |
| 3,920,333 | 11/1975 | Wally, Jr. . |
| 3,998,456 | 12/1976 | Wally, Jr. . |
| 4,181,427 | 1/1980 | Rotter .................................. 355/43 |
| 4,285,587 | 8/1981 | Schiff et al. .......................... 355/66 |
| 4,325,630 | 4/1982 | Kimura et al. ........................ 355/74 |
| 4,344,701 | 8/1982 | Klose et al. . |
| 4,417,810 | 11/1983 | Ueda et al. ............................ 355/74 |
| 4,451,142 | 5/1984 | Takenaka et al. ..................... 355/55 |
| 4,555,165 | 11/1985 | Negoro ................................. 355/55 |
| 4,737,825 | 4/1988 | Davis .................................... 355/74 |

FOREIGN PATENT DOCUMENTS 962492 2/1975 Canada .................................. 355/45
2028522 3/1980 United Kingdom .

Primary Examiner—Monroe H. Hayes
Attorney, Agent, or Firm—Oblon, Spivak, McClelland, Maier & Neustadt

[57] ABSTRACT

A copyboard and a platen are disposed horizontally so that a copy can be horizontally placed on the copyboard and a photosensitive medium can be horizontally supported on the platen. A mirror disposed above the copyboard and a movable mirror disposed above the platen jointly form an optical path extending from the copyboard to the platen, while shortening the distance between the copyboard and the platen. Two pairs of mask plates are disposed in front of and parallel to the surface of the platen on which the photosensitive medium is to be supported, the mask plates being independently movable along two axes perpendicular to each other. The distances from the optical axis to the mask plates are determined for each of images to be photographed on the photosensitive medium, based on various input data including a photographing dimension, the distances between the photosensitive medium and the mask plates, etc.

6 Claims, 7 Drawing Sheets

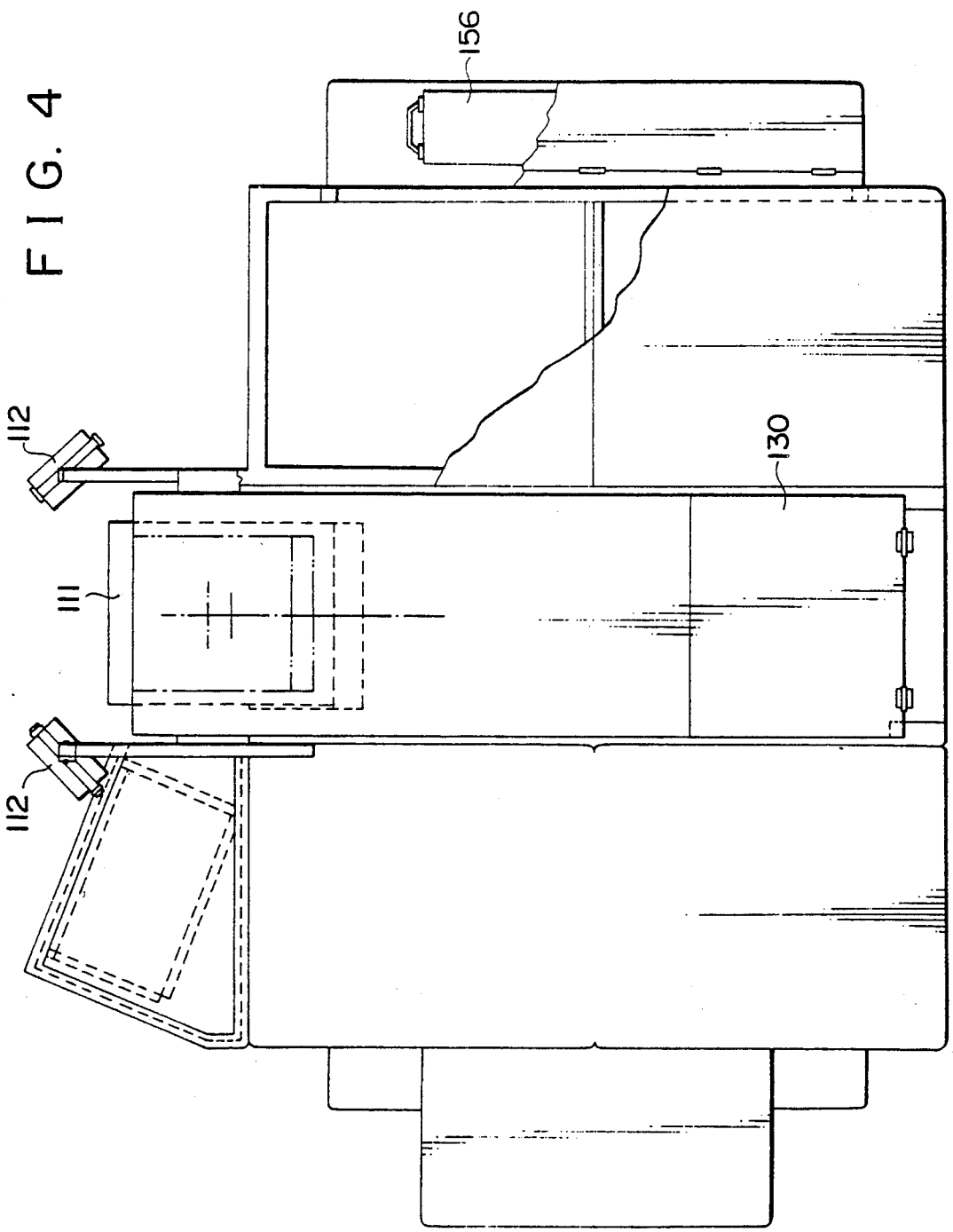

PROCESS CAMERA

BACKGROUND OF THE INVENTION

The present invention relates to a process camera which is easy to handle, is compact so that it only takes up a small space, and can be used in a fully bright environment, and more particularly to a process camera suitable for imposing multiple-page copy images on a large photosensitive medium for platemaking.

Various process cameras for imposing copy images made up of many pages are known from U.S. Pat. Nos. 3,998,546, 3,837,742, and 3,920,333, for example. According to the disclosed process cameras, a copyboard for holding a copy to be photographed and a platen for supporting a photosensitive medium are vertically disposed in confronting relation. When a copy and a photosensitive medium are to be placed on the copyboard and the platen, respectively, the copy and the photosensitive medium must be held vertically and attached to the copyboard and the platen which extend vertically. Therefore, it is troublesome to handle the copy and the photosensitive medium when they are to be set on the copyboard and the platen. In order to maintain a desired optical path length from the copyboard to the platen, it is necessary to keep the copyboard and the platen spaced from each other by a certain long distance. With the copyboard and the platen being thus spaced widely from each other, the entire process camera is long and takes up a large installation space.

Japanese Utility Model Application No. 62(1987)-93665 filed by the applicant of the present application discloses a process camera which employs a mirror to bend an optical path. The mirror allows the image of a copy on a horizontal copyboard to be projected onto a photosensitive medium on a vertical platen. Therefore, the copy can easily be handled when it is attached to the copyboard. Another advantage is that the overall length of the camera is small as the optical path is bent by the mirror.

In each of the conventional process cameras described above, however, since at least the platen is placed horizontally, a photosensitive medium should be handled with the aid of a highly reliable suction device so that the photosensitive medium will not fall off the platen. Accordingly, it is still troublesome and inconvenient to handle the photosensitive medium at the time it is to be attached to the platen. The process cameras are considerably long, and much remains to be improved to make them more compact. The process camera proposed by the applicant employs a lens and a single mirror, and lends itself to the production of a direct press plate because they can produce a positive image.

If a photosensitive medium produces a negative image, however, the negative image must be converted to a reversed image. To this end, there is used a process camera in which a copy and a photosensitive medium are vertically disposed in confronting relation to each other with a focusing lens interposed therebetween, as disclosed in the U.S. Patents referred to above. The process cameras disclosed in the above U.S. Patents do not have any means for confirming the position of the copy, and suffer difficulty in positioning the copy. Stated otherwise, since there is no means for confirming the position of the copy, the copy and the photosensitive medium are vertically arranged in confronting relation to each other to facilitate the positioning of the copy.

If a direct press plate is used as a photosensitive medium in the conventional process camera which imposes multiple-page copy images, then it is difficult to photograph back signatures and other marks on non-image areas outside the pages. These marks have heretofore been photographed by contact printing in a printer. More specifically, a portion of the process camera which includes the platen is placed in a dark room in which a printer, an image developing machine, etc. are disposed. After a copy having a certain number of pages has been photographed on a photosensitive medium by the process camera, the photosensitive medium is removed from the process camera, and set on the printer. On the printer, a masking sheet of paper is placed over the photosensitive medium. The masking sheet has an area for shielding photographed copy images from light and marks to be printed in non-image areas between the copy images. The masking sheet is superposed on the photosensitive medium and held in registration therewith by pins inserted in perforations defined in the masking sheet and the photosensitive medium, and the marks on the masking sheet are printed on the non-image areas by contact printing in the printer. The copy images which have been photographed by the process camera remain on the photosensitive medium, and the marks which include back signatures and other outside-page information marks are printed on the non-image areas. Unwanted portions of the non-image areas are exposed to light. The photosensitive medium with the necessary marks printed is then processed by the image developing machine which develops the copy images, whereupon a direct press plate is completed.

When a positive-negative photosensitive medium is employed, other areas than photographed copy images on the photosensitive medium are not exposed to light. If the copy images on the photosensitive medium were developed and used directly to produce a printing plate, non-image areas outside of the pages would be printed. To avoid such a drawback, it is necessary to either expose the non-image areas outside of the pages to light or apply a separate mask to the photosensitive medium when a printing plate is produced from the photosensitive medium. In a dark room, a masking sheet of paper is placed on the photosensitive medium and printed by direct printing in a printer, and the non-image areas are exposed to light.

Irrespective of the type of a photosensitive medium used, therefore, it has to be processed by the direct printing process in a printer placed in a dark room in order to print back signatures and other marks on non-image areas or expose the non-image areas to light. Since the direct printing process is manually carried out, it is tedious, time-consuming, and inefficient.

In view of the aforesaid shortcomings, the applicant has proposed a process camera by which necessary outside-page information marks are automatically photographed on a photosensitive medium after a multiple-page copy has been photographed thereon, as disclosed in Japanese Patent Application No. 63(1988)-122543. According to the proposed process camera, no manual operation is required in a dark room, the process camera is easy to handle, and highly efficient.

In the proposed process camera, a platen with a photosensitive medium mounted thereon is moved along two perpendicular axes within the plane of the photosensitive medium until a photographing position on the photosensitive medium is established. A range or area in which an image is to be photographed on the photosensitive medium is selected by independently moving two pairs of, i.e., four, mask plates along the above axes in front of the photosensitive medium set on the platen.

The mask plates are however not moved while in intimate contact with the photosensitive medium on the platen, but a gap or clearance exists between each of the mask plates and the photosensitive medium. Since the photosensitive medium can automatically be set on and removed from the platen, the clearance between the mask plates and the photosensitive medium is large so as to provide enough space for allowing a photosensitive medium carrier to move between the platen and the mask plates. Therefore, the positions of the mask plates are not determined by only photographing dimensions at the time, but vary depending on various photographing conditions such as the distance between the photosensitive medium and the mask plates, the photographing magnification, the focal length of the focusing lens, etc. The positions to which the mask plates are to move must be independently determined because the distances from the platen to the respective mask plates differ from each other to avoid physical interference between the mask plates.

SUMMARY OF THE INVENTION

It is an object of the present invention to provide a process camera which allows a copyboard and a platen to be horizontally placed so that a copy and a photosensitive medium can easily be handled, and which permits the copyboard and the platen to be positioned closely to each other so that the process camera can be rendered compact in size.

Another object of the present invention is to provide a process camera employing mirrors which are of as small a size as possible, have a high degree of accuracy, and can be manufactured with ease.

Still another object of the present invention is to provide a process camera which has a total of four mask plates that can automatically be controlled in position independently of each other based on various data such as photographing conditions, the distance between a photosensitive medium and the mask plates, the photographing magnification, the focal length of a focusing lens used, etc., so that a photosensitive medium free of any unexposed areas can finally be produced automatically.

According to the present invention, there is provided a process camera comprising a horizontal copyboard for placing a copy thereon, a horizontal platen for supporting a photosensitive medium thereon, a mirror disposed above the copyboard for laterally reflecting light from the copyboard, a focusing lens disposed in an optical path along which the light reflected by the mirror travels, a movable mirror disposed above the platen and movable into and out of the optical axis of the focusing lens, the movable mirror being capable of bending the optical axis of the focusing lens toward the platen when the movable mirror is moved into the optical axis of the focusing lens, and an index plate positioned on the optical axis of the focusing mirror when the movable mirror is moved out of the optical axis, the index plate being disposed in conjugate relation to the platen.

An optical path extending from the mirror disposed above the copyboard through the focusing lens and the movable mirror to the index plate may be inclined such that the mirror above the copyboard is positioned higher than the movable mirror.

With the above arrangement, since the image of a copy placed on the horizontal copyboard is focused on a photosensitive medium on the platen through the two mirrors, the platen is placed horizontally. Therefore, the copy and the photosensitive medium can be handed more easily than in a conventional process camera in which the copyboard and the platen are vertically disposed. Because the two mirrors are used, the optical path from the copyboard to the platen is directed upwardly, horizontally, and then downwardly. Consequently, in order to achieve a certain optical path length, the horizontal dimensions of the process camera can be reduced to make the process camera more compact in size. The user of the two mirrors can meet the need to reverse the image of a copy and photograph the reversed image on the photosensitive medium in the same manner as when no mirror is used.

If the optical path is inclined such that the mirror above the copyboard is higher in position, then the distance between the copyboard and the mirror above the copyboard can be increased, and the mirror can be positioned near the focusing lens where the optical path is constricted. As a result, the mirror can be made smaller, and can be manufactured with ease and high accuracy. The copyboard and the platen can be positioned closely so as to partly overlap each other while maintaining the required optical path length. The process camera is thus rendered compact in size.

According to the present invention, there is also provided a process camera comprising a platen for supporting a photosensitive medium, the platen being movable in a plane parallel to a surface thereof on which the photosensitive medium can be supported and along two axes perpendicular to each other, a focusing lens for focusing images onto the photosensitive medium supported on the platen, two pairs of mask plates disposed in front of and parallel to the surface of the platen, the mask plates being independently movable along the two axes, means for photographing images of text and outside-page information marks on the photosensitive medium on the platen in a predetermined sequence while moving the platen and the mask plates, the mask plates being spaced from the platen by different distances so that the mask plates will be kept out of physical interference with each other when independently moved, and means for calculating distances from the optical axis of the focusing lens to the mask plates for each of the images, based on input data including a photographing dimension, the distances between the photosensitive medium and the mask plates, a photographing magnification, and the focal length of the focusing lens, and for positioning the mask plates at the calculated distances from the optical axis.

The positions of the four mask plates can be individually controlled by a computer based on the input data for successively photographing images on the single photosensitive medium. Therefore, the desired images can automatically be photographed without manual intervention, and the entire surface of the photosensitive medium can be exposed.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a plan view of the process camera shown in FIG. 2;

FIG. 5 is a schematic front elevational view of a mask device employed in the process cameras of the invention;

FIG. 6 is a diagram showing an optical system of the process cameras;

DETAILED DESCRIPTION

Figure 1:
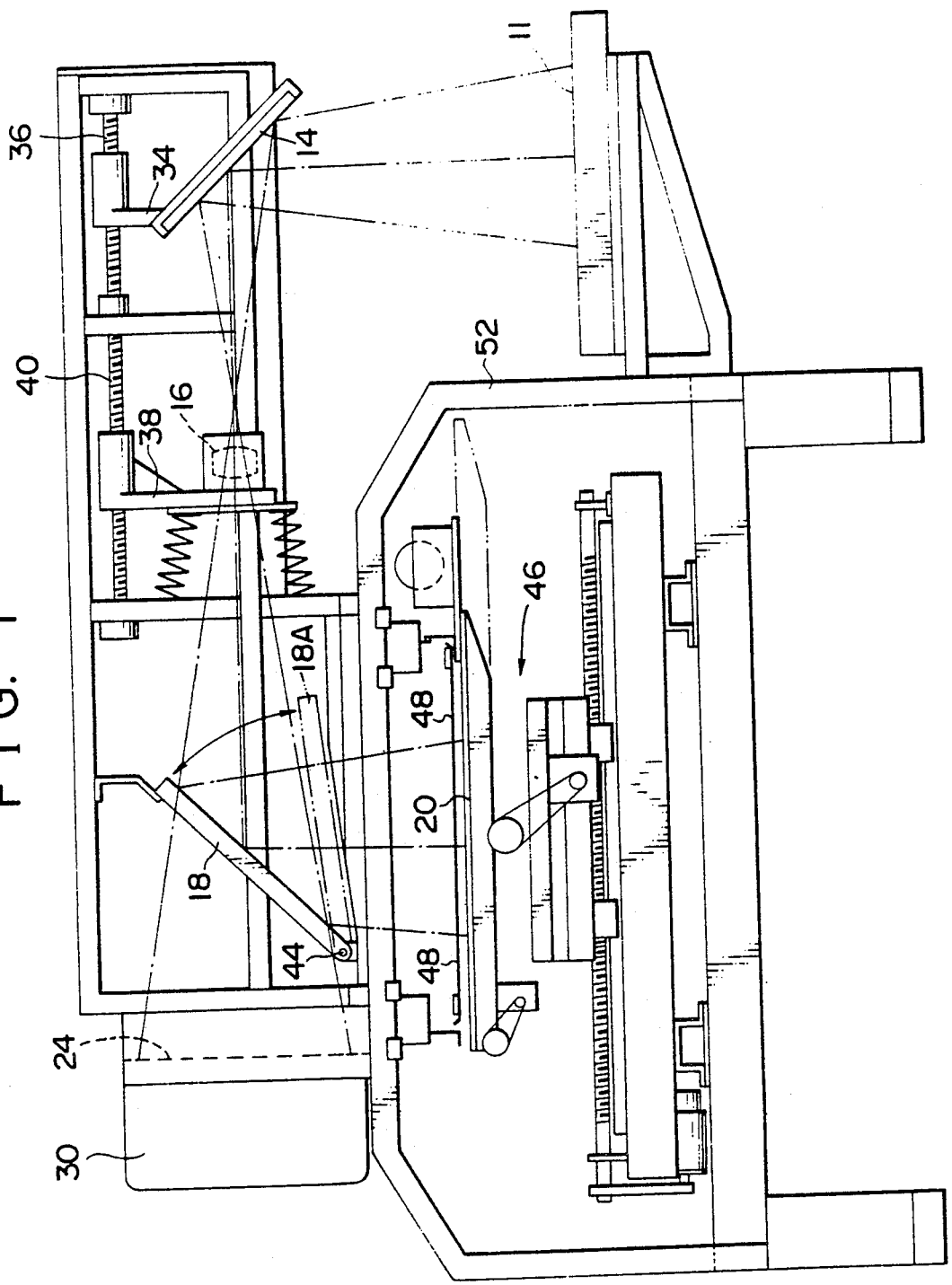
FIG. 1 is a side elevational view of a process camera according to an embodiment of the present invention.

As shown in FIG. 1, a process camera according to the present invention has a copyboard 11 for placing a copy on a horizontal surface thereof, the copyboard 11 being mounted horizontally on an outer wall surface of a camera housing 52. A copy placed on the copyboard 11 may be held in position under a vacuum by a copy suction device (not shown). A light source (not shown) for illuminating a copy on the copyboard 11 is disposed obliquely upwardly of the copyboard 11.

A mirror 14 for directing light reflected from a copy on the copyboard 11 to travel horizontally is disposed above the copyboard 11 and inclined at an angle of 45 degrees with respect to the horizontal direction. The mirror 14 is supported by a mirror holder 34 which is threaded over a horizontal feed screw 36. The mirror holder 34 is horizontally movable along a suitable guide (not shown) by the feed screw 36, but is kept nonrotatable around the feed screw 36 by the guide. The feed screw 36 is rotatable about its own axis by a stepping motor or the like (not shown).

A focusing lens 16, a movable mirror 18, and an index plate 24, which are arranged in the order named, are disposed on the optical path along which light reflected from the copyboard 11 and directed by the mirror 14 travels. The focusing lens 16 is supported by a lens holder 38 which is threaded over a horizontal feed screw 40. The lens holder 38 has a shutter (not shown) for selectively opening and closing the optical path through the focusing lens 16. The lens holder 38 is horizontally movable along a suitable guide (not shown) by the feed screw 40, but is kept nonrotatable around the feed screw 40 by the guide. The feed screw 40 is rotatable about its own axis by a stepping motor or the like (not shown).

A platen 20 is horizontally disposed in the camera housing 52. A relatively large photosensitive medium can be positioned in place on a horizontal surface of the platen 20 by a copy suction device (not shown). The platen 20 can be moved in one horizontal plane in X and Y directions by an XY feeder 46. The XY feeder 46 includes crossing feed screws which are rotatable by respective stepping motors (not shown) that are independently energizable to move the platen 20 in the X and Y directions. A mask plate assembly 48 is positioned immediately in front of, i.e., above, the surface of the platen 20 which holds a photosensitive medium thereon. The mask plate assembly 48 comprises left, right, front, and rear mask plates which are independently movable to freely select the widths in the X and Y directions of an opening that is jointly defined by the mask plates. Near the platen 20, there are disposed a feed device (not shown) for feeding a photosensitive medium onto the platen 20, and another feed device (not shown) for feeding an exposed photosensitive medium from the platen 20 into an image developing machine (not shown).

The movable mirror 18 is rotatable about a shaft 44 between an elevated position (indicated by the solid lines) in which the movable mirror 18 is angularly lifted and inclined at 45 degrees to the optical axis of the focusing lens 16 and a lowered position (indicated by the chained lines 18A) in which the movable mirror 18 is angularly retracted downwardly out of the optical path through the focusing lens 16. When the movable mirror 18 is in the elevated position, it bends the optical axis of the focusing lens 16 at a right angle toward the platen 20. When the movable mirror 18 is in the lowered position, the optical axis of the focusing lens 1 is directed toward the index plate 24 which lies vertically. The index plate 24 is positioned in conjugate relation to the upper surface of the platen 20 with respect to the movable mirror 18. The index plate 24 is marked with two central lines extending in the X and Y directions and crossing perpendicularly to each other. The index plate 24 ca be covered with an illuminating box 30. The illuminating box 30 can open and close its area corresponding to the index plate 24 by rotating such area about an appropriate shaft. The illuminating box 30 houses therein a light source (not shown) for illuminating the index plate 24.

When the movable mirror 18 is in the elevated position, there is established a focusing optical system for focusing the image of a copy on the copyboard 11 onto the platen 20. When the movable mirror 18 is in the lowered position, there is established a focusing optical system for focusing the image of a copy on the copyboard 11 onto the index plate 24 with the light source associated with the copyboard 11 being turned on and the light source associated with the index plate 24 being turned off. When the light source associated with the copyboard 11 is turned off and the light source associated with the index plate 24 is turned on, there is established a projecting optical system for projecting the image of the index plate 24 onto the copyboard 11.

Operation of the process camera thus constructed will be described below.

The movable mirror 18 is retracted into the lowered position 18A, a copy is placed on the copyboard 11. When the light source associated with the copyboard 11 is turned on, the image of the copy is focused by the mirror 14 and the focusing lens 16 onto the index plate 24. The operator can observe how the image of the copy is focused onto the index plate 24 by opening the area of the illuminating box 30 which corresponds to the index plate 24. The copy on the copyboard 11 can be moved over and positioned in place by the operator so that central marks on the copy in the X and Y directions will be aligned with the crossing central lines marked on the index plate 24.

After the copy has been positioned on the copyboard 11, a marking tape or the like is applied to the index plate 24 along the outer edges of a text containing characters or the like of the copy image focused on the index plate 24. At least one tape mark is sufficient in each of the X and Y directions. Then, the first image of the copy which has been positioned is photographed on a photosensitive medium mounted on the platen 20. More specifically, the shutter on the lens holder 38 for the focusing lens 16 is closed, the movable mirror 18 is lifted to the elevated position, and the shutter is opened for given seconds and then closed again. The platen 20 has been positioned in the X and Y directions so that the image of the copy is photographed on the photosensitive medium in a predetermined position.

To photograph a next copy, the light source associated with the copyboard 11 is turned off, the movable mirror 18 is retracted into the lowered position, the area of the illuminating box 30 corresponding to the index plate 24 is closed, and the light source associated with the index plate 24 is turned on to project the image of the index plate 24 onto the copyboard 11 through the focusing lens 16 and the mirror 14. Therefore, the crossing central lines marked on the index plate 24 and the tape marks applied thereto are projected onto the copyboard 11. Thereafter, a next copy is placed on the copyboard 11 and positioned so that the outer edges of the text of the copy are aligned with the projected tape marks. The copy may be positioned by bringing the central marks of the copy in the X and Y directions into alignment with the crossing central lines projected onto the copyboard 11. However, it is necessary to position the copy with respect to four locations, i.e., left, right, front, and rear locations, according to such a positioning process. Using the tape marks, the operator can quickly position the copy since the copy only needs to be positioned with respect to two locations.

After the completion of the positioning of the copy, the image of the copy is photographed on the photosensitive medium on the platen 20 according to the aforesaid procedure. The above process is repeated to photograph the images of a number of copies successively on the photosensitive medium. Each time the image of one copy has been photographed, the platen 20 is moved over given intervals by the XY feeder 46 so that the images of many copies can be successively photographed on the single photosensitive medium.

The mirror 14 is horizontally movable by the feed screw 36 to vary the distance between the copyboard 11 and the focusing lens 16 for thereby varying the magnification. The focusing lens 16 is also horizontally movable by the feed screw 40 to correct a defocused condition caused by a change in the magnification and also make general focusing adjustments.

With the embodiment described above, since the image of a copy on the horizontal copyboard 11 is focused onto a photosensitive medium on the platen 20 through the two mirrors 14, 18, the plate 20 is also placed horizontally. As a result, the copy and the photosensitive medium can be handled more easily than in the conventional process cameras in which the copyboard and the platen are vertically arranged. Furthermore, the optical path from the copyboard 11 to the platen 20 is directed upwardly, horizontally, and downwardly by the two mirrors 14, 18. Therefore, a certain required optical path length can be obtained even if the camera has reduced horizontal dimensions and is hence compact in size. While the use of two mirrors is not novel itself in other fields of art, the two mirrors can meet requirements for reversing a copy image and photographing it on a photosensitive medium in the same manner as when no mirror is used.

In addition, a copy on the copyboard 11 can be positioned with respect to the image of the index plate 24 which is projected onto the copyboard 11. Since it is not necessary to define positioning holes or notches in a copy in advance, the process of manufacturing press plates is simplified.

The stepping motors of the process camera may be controlled by a computer or a similar control circuit such that the entire sequence of steps, including setting a photosensitive medium on the platen 20, photographing the images of a number of copies on the photosensitive medium in successive positions thereon, and feeding the exposed photosensitive medium to the image developing machine, can fully automatically be carried out in a bright environment under the direction of a single operator. In this connection, the process cameras disclosed in the prior U.S. Patents referred to above are operated manually almost entirely, and require photosensitive mediums to be handled in the dark room. Therefore, the earlier process cameras are inefficient to operate and require skilled manual labor to get operated on.

A process camera according to another embodiment of the present invention will be described with reference to FIGS. 2 through 4.

Figure 2:
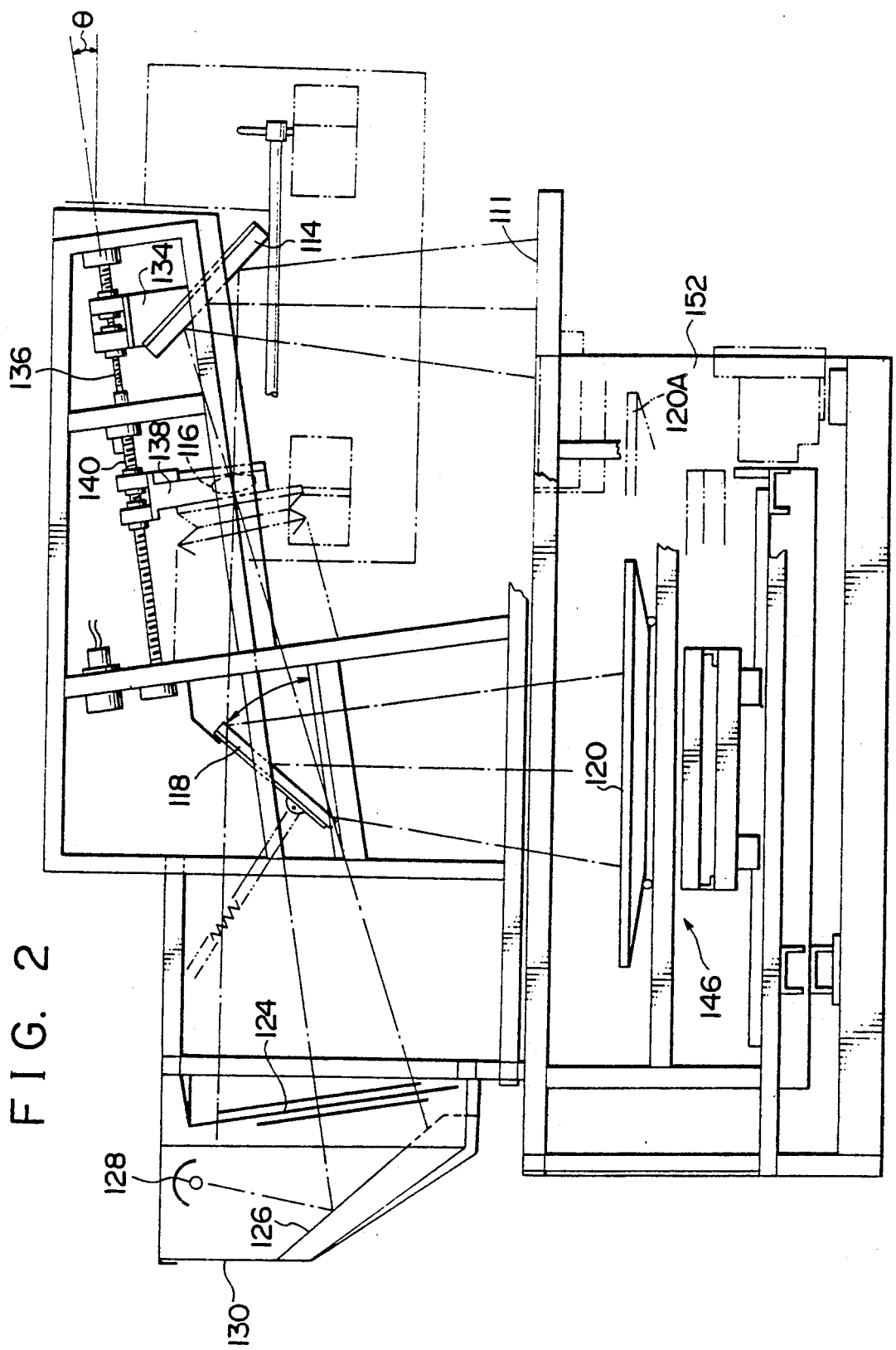
FIG. 2 is a side elevational view of a process camera according to another embodiment of the present invention.
Figure 3:
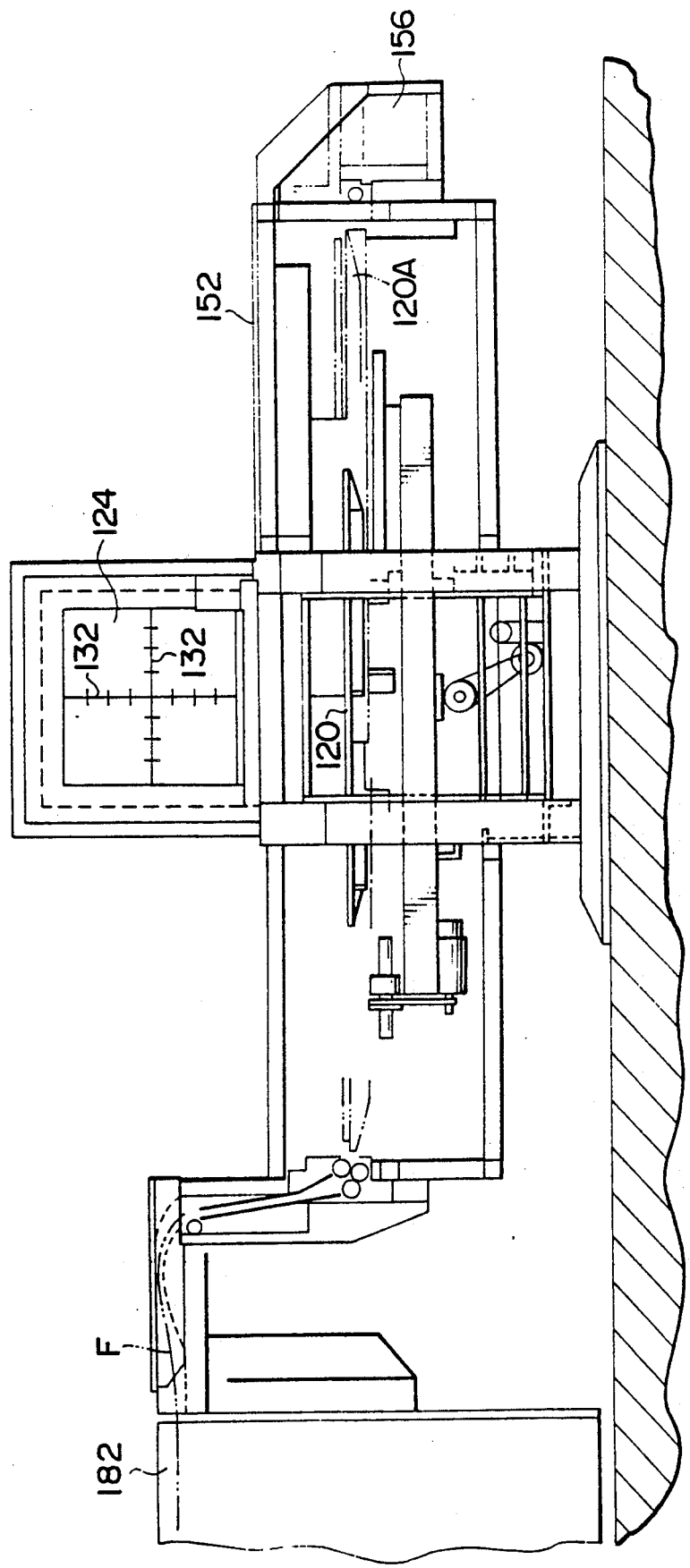
FIG. 3 is a front elevational view of the process camera shown in FIG. 2.

As shown in FIGS. 2 through 4, a copyboard 111 is partly embedded in an upper end portion of a camera housing 152 and lies horizontally for placing a copy on its horizontal surface. As shown in FIG. 4, a pair of light sources 112 for illuminating a copy placed on the copyboard 111 is disposed obliquely upwardly of the copyboard 111. A mirror 114 for bending laterally light reflected from a copy on the copyboard 111 is obliquely positioned above the copyboard 111. The mirror 114 is supported by a mirror holder 134 which is threaded over a feed screw 136. The mirror holder 134 is horizontally movable along a suitable guide (not shown) by the feed screw 136, but is kept nonrotatable around the feed screw 136 by the guide. The feed screw 136 is rotatable about its own axis by a stepping motor or the like (not shown).

A focusing lens 116, a movable mirror 118, and an index plate 124, which are arranged in the order named, are disposed on the optical path along which light reflected from the copyboard 111 and directed by the mirror 114 travels. The focusing lens 116 is supported by a lens holder 138 which is threaded over a feed screw 140. The lens holder 138 has a shutter (not shown) for selectively opening and closing the optical path through the focusing lens 116. The lens holder 138 is movable along a suitable guide (not shown) by the feed screw 140, but is kept nonrotatable around the feed screw 140 by the guide. The feed screw 140 is rotatable about its own axis by a stepping motor or the like (not shown).

A platen 120 is horizontally disposed in the camera housing 152. The platen 120 can be moved in one horizontal plane in X and Y directions by an XY feeder 146. The XY feeder 146 includes crossing feed screws which are rotatable by respective stepping motors (not shown)

that are independently energizable to move the platen 120 in the X and Y directions. Two pairs or, i.e., four, mask plates which are movable along two perpendicularly crossing axes are disposed in front of the platen 120. Near the platen 120, there are disposed a feed device (not shown) for cutting a rolled photosensitive medium into a sheet-like photosensitive medium and feeding the photosensitive medium onto the platen 120, and another feed device (not shown) for feeding an exposed photosensitive medium from the platen 120 into an image developing machine (not shown).

The movable mirror 118 is rotatable about a shaft between an elevated position (indicated by the solid lines in FIG. 2) in which the movable mirror 118 is angularly lifted to bend the optical axis of the focusing lens 116 downwardly and a lowered position (indicated by the chained lines 118A) in which the movable mirror 118 is angularly retracted downwardly out of the optical path through the focusing lens 116. When the movable mirror 118 is in the elevated position, it bends the optical axis of the focusing lens 116 at a right angle toward the platen 120. When the movable mirror 118 is in the lowered position, the optical axis of the focusing lens 116 is directed toward the index plate 124. The index plate 124 is positioned in conjugate relation to the upper surface of the platen 120 with respect to the movable mirror 118. The index plate 124 is marked with two central lines 132 extending in the X and Y directions and crossing perpendicularly to each other, as shown in FIG. 3. The index plate 124 can be covered with an illuminating box 130. The illuminating box 130 can open and close its area corresponding to the index plate 124 by rotating such area about an appropriate shaft. The illuminating box 130 houses therein a light source 128 for illuminating the index plate 124, and a mirror 126 for reflecting illuminating light from the light source 128 toward the index plate 124.

The process camera shown in FIGS. 2 through 4 differs from the process camera shown in FIG. 1 in that the feed screws 136, 140 are inclined an angle $\theta$ to the horizontal direction so that the mirror 114 above the copyboard 111 is positioned higher than the mirror 118 above the platen 120, and the optical axis of the focusing lens 116 is inclined the angle $\theta$ to the horizontal direction so that it extends parallel to the feed screws 136, 140. The mirror 114 and the movable mirror 118 are inclined at such an angle that the central optical axis extending from the copyboard 111 to the mirror 114 and the central optical axis extending from the platen 120 to the mirror 118 lie perpendicularly to the horizontal direction.

When the movable mirror 118 is in the elevated position, there is established a focusing optical system for focusing the image of a copy on the copyboard 111 onto the platen 120. When the movable mirror 118 is in the lowered position, there is established a focusing optical system for focusing the image of a copy on the copyboard 111 onto the index plate 124 with the light sources 112 being turned on and the light source 128 being turned off. When the light sources 112 are turned off and the light source 128 is turned on, there is established a projecting optical system for projecting the image of the index plate 124 onto the copyboard 111.

As illustrated in FIG. 3, the platen 120 is horizontally movable from a substantially central position, indicated by the solid lines, to one at a time of positions, indicated by the chained lines 120A, in which the platen 120 can receive a photosensitive medium F from a film cartridge 156 and can deliver a photographed photosensitive medium F to an image developing machine 182. The platen 120 is also movable in X and Y directions within the housing 152 so that the images of copies can be successively photographed on the photosensitive medium F in successive positions thereon. The copyboard 111 and the platen 120 are positioned closely to each other such that when the platen 120 is moved to a corner of the housing 152, the platen 120 reaches a position below a portion of the copyboard 111. The copyboard 111 and the platen 120 can be positioned closely to each other because the optical path is inclined to elevate the mirror 114 higher than the movable mirror 118, thus making the actual optical path longer than the horizontal distance between the mirrors 114, 118, and also because the mirror 114 is located at a higher position to maintain the required optical path length between the copyboard 111 and the mirror 114, thereby making it possible to position the copyboard 111 in a higher place and the platen 120 in a lower place.

The process camera shown in FIGS. 2 through 4 operates in the same manner as the process camera shown in FIG. 1. Therefore, operation of the process camera of FIGS. 2 through 4 will not be described below.

According to the embodiment shown in FIGS. 2 through 4, inasmuch as the optical path is inclined to the vertical direction such that the mirror 114 above the copyboard 111 is positioned higher than the mirror 118 above the platen 120, the required optical path length can be maintained even if the copyboard 111 and the platen 120 are closely positioned until they partly overlap each other. As a result, the process camera is rendered more compact in size.

The mask plate assembly 48 shown in FIG. 1 and the mask plates positioned in front of the platen 120 shown in FIGS. 2 through 4 will be described in greater detail.

As shown in FIG. 5, a horizontal axis X and a vertical axis Y perpendicular to the horizontal axis X lie in a plane parallel to the sheet of FIG. 5. The platen 20 or 120 is disposed in a plane parallel to the plane containing the axes X, Y. Two mask plates in one pair are denoted by $s_1$, $s_2$, whereas two mask plates in the other pair are denoted by $s_3$, $s_4$. A range or zone in which an image is photographed on a single photosensitive medium is determined by these four mask plates. The mask plates $s_1$, $s_2$ in one pair have confronting edges extending parallel to the Y axis, and can be translated along the X axis. The mask plates $s_3$, $s_4$ in the other pair have confronting edges extending parallel to the X axis, and can be translated along the Y axis. The mask plates $s_1$, $s_2$, $s_3$, $s_4$ are movable in different plates so that they will not physically interfere with each other, i.e., are spaced at different distances from the upper surface of the platen on which a photosensitive medium is to be mounted. The mask plates $s_1$, $s_2$, $s_3$, $s_4$ are independently movable by actuators (not shown) such as stepping motors which are controlled by a computer (not shown).

A representative one of the mask plates is denoted at s in FIG. 6. The mask plate s is disposed in front of the surface of a platen 1 on which a photosensitive medium F is to be mounted, the mask plate s being spaced from the platen surface by a gap M. A feed device 3 for feeding the photosensitive medium F is movably disposed in the gap M. The feed device 3 withdraws the photosensitive medium F from a magazine (not shown) and sets the photosensitive medium F on the platen 1, and also removes the photographed photosensitive medium F from the platen 1 and delivers the photosensitive medium F to an image developing machine (not shown). The feed device 3 has a suction device, for example, for attracting the photosensitive medium F. Operation of the suction device and movement of the feed device 3 are controlled by the computer. The image of a copy 8 placed on a copyboard 7 is focused onto the photosensitive medium F on the platen 1 by a focusing lens 4. If it is assumed that the optical axis of the focusing lens 4 on the photosensitive medium F is represented by 0 and the width of each of the $s_1$, $s_2$, $s_3$, $s_4$ is represented by 1, then these mask plates can be moved from the position of the optical axis 0 in the X or Y direction by a maximum of $1\frac{1}{2}$.

As shown in FIG. 6, it is assumed that the photographing dimension, i.e., the distance from the optical axis to an edge of an exposure range defined on the photosensitive medium F by the mask plate s is indicated by H, the photographing magnification produced by the focusing lens 4 is indicated by n, the distance from the optical axis to the edge of the mask plate s by S, the focal length of the focusing lens by f, the distance from the focusing lens 4 to the photosensitive medium F at a certain magnification ratio by L, and the distance between the photosensitive medium F and the mask plate s by M. Because of the distance M, the distance S is smaller than the distance H by a distance $\Delta S$. The distance $\Delta S$ is not constant, but variable depending on the values of H, n, f, M, and the distance M varies with each mask plate. Consequently, the distance S from the optical axis to the edge of each mask plate must be determined depending on the values H, n, f for each mask plate.

The process of determining the distance S for each mask plate will be described below.
Since $$H = S + \Delta S$$

we obtain $$S = H - \Delta S \qquad (1)$$

On the other hand, $$L = (1+n)f \qquad (2)$$

and $$S = H \times M/L \qquad (3)$$

By putting the equation (3) into the equation (1), we obtain $$S = H - (H \times M/L) \qquad (4)$$

By putting the equation (2) into the equation (4), we obtain $$S = H - \frac{H \times M}{(1+n)f} = H\left(1 - \frac{M}{(1+n)f}\right)$$

Figure 7:
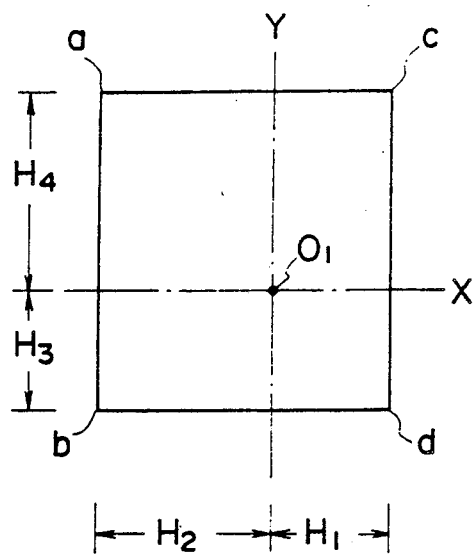
FIG. 7 is a front elevational view showing by way of example a photographed image produced by the mask device.
Figure 8:
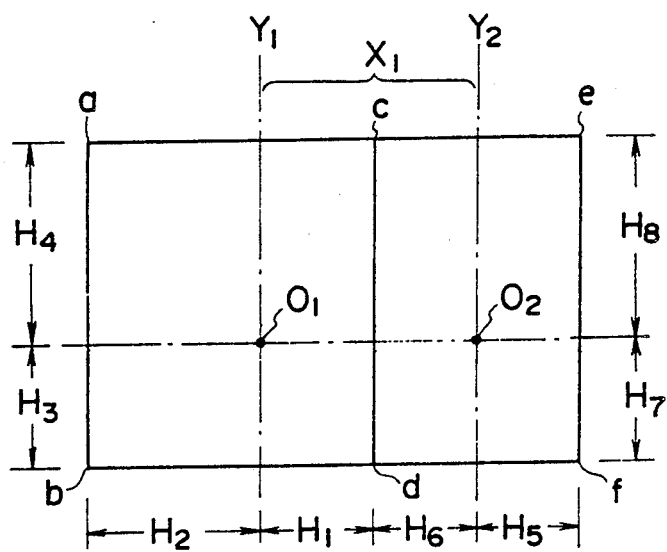
FIG. 8 is a front elevational view showing the manner in which a next image is photographed following the photographed image shown in FIG. 7.

As shown in FIG. 7, it is assumed that a first image is photographed in a range defined by points a, b, c, d, and that a photographing range defined in the X direction by the mask plate $s_1$ and extending from the optical axis $O_1$ is indicated by $H_1$, a photographing range defined in the X direction by the mask plate $s_2$ and extending from the optical axis $O_1$ is indicated by $H_2$, a photographing range defined in the Y direction by the mask plate $s_3$, and extending from the optical axis $O_1$ is indicated by $H_3$, and a photographing range defined in the Y direction by the mask plate $s_4$ and extending from the optical axis $O_1$ is indicated by $H_4$. Then, the distances $S_1$, $S_2$, $S_3$, $S_4$ of the edges of the mask plates $s_1$, $s_2$, $s_3$, $s_4$ from the optical axis $O_1$ are given respectively as follows:

$$S_1 = H_1 - \frac{H_1 \times M_1}{(1+n)f}$$

$$S_2 = H_2 - \frac{H_2 \times M_2}{(1+n)f}$$

$$S_3 = H_3 - \frac{H_3 \times M_3}{(1+n)f}$$

$$S_4 = H_4 - \frac{H_4 \times M_4}{(1+n)f}$$

It is then assumed that a rectangular range defined by points c, d, e, f is to be exactly photographed by the second exposure. Since this rectangular range is shifted a distance $X_1$ from the first range in the X direction, the platen 1 is moved $X_1$ in the X direction, and the distances $S_1$, $S_2$, $S_3$, $S_4$ of the edges of the mask plates $s_1$, $s_2$, $s_3$, $s_4$ from the optical axis $O_2$ are determined respectively as follows:

$$S_1 = H_5 - \frac{H_5 \times M_1}{(1+n)f}$$

$$S_2 = H_6 - \frac{H_6 \times M_2}{(1+n)f}$$

$$S_3 = H_7 - \frac{H_7 \times M_3}{(1+n)f}$$

$$S_4 = H_8 - \frac{H_8 \times M_4}{(1+n)f}$$

The dimensions $H_1$, $H_2$, $H_3$, $H_4$ are photographing dimensions defined by the edges of the $s_1$, $s_2$, $s_3$, $s_4$ and extending from the optical axis on the photosensitive medium.

Likewise, the positions of optical axes $O_3$, $O_4$, $O_5$, ... are successively determined in an unexposed area on the photosensitive medium, and the distances from each of the optical axes to the edges of the mask plates are determined. Then, images are successively photographed in third, fourth, fifth, ... exposures. As a result, the entire photosensitive medium can be exposed exactly over its desired area. The sequence in which images are photographed is not limited to the order of $O_1$, $O_2$, $O_3$, ..., but may be selected as desired.

Figure 9:
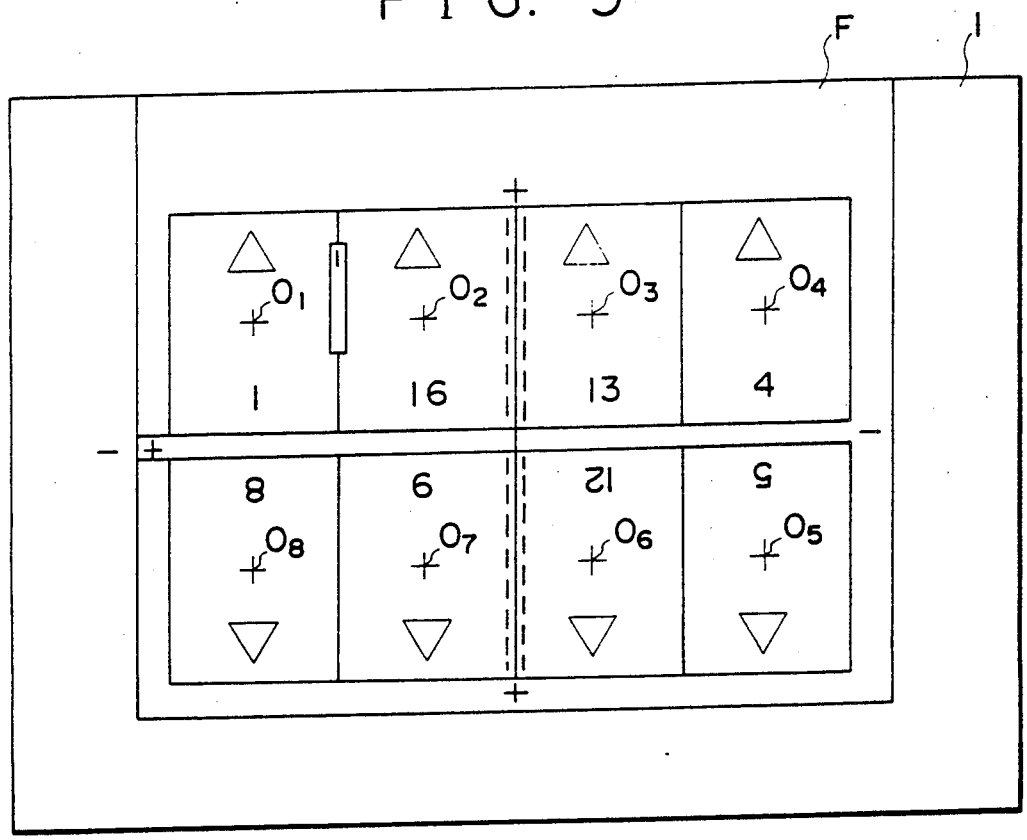
FIG. 9 is a front elevational view of a format of images which are photographed on a single photosensitive medium by the process cameras.

FIG. 9 shows a format of multiple-page images photographed on a single photosensitive medium. The illustrated format has 8 imposed pages of text, an outer form, is of the first edition, and indicates lefthand binding. The triangular marks in FIG. 9 indicate the top edges of the pages. The top edges and the sequence of the page numbers are predetermined according to the printing and binding standards. The pages have centers indicated by $O_1$, $O_2$, $O_3$, ... which are also indicative of the positions of the optical axes at the time the pages are photographed. If the pages are photographed in the order of page numbers, then the coordinate center $O_1$ of the platen should be aligned with the optical axis in the first exposure, and thereafter the platen is moved in the order of $O_4$, $O_5$, $O_6$, $O_7$, ... to repeatedly photograph the pages. When all the page have been photographed, then outside-page information marks (such as register marks, back signatures, etc.) indicative of the form of the pages and folding positions are photographed. The entire photographing process is now finished.

It is important that no unexposed area remain on the photosensitive medium outside of the photographed images, and no double exposure be permitted in the image area. In order to meet such requirements, the mask plates should exactly be controlled.

The positions of the platen and the distances of the edges of the mask plates from the optical axes in the photographing cycles will be described below.

Figure 10:
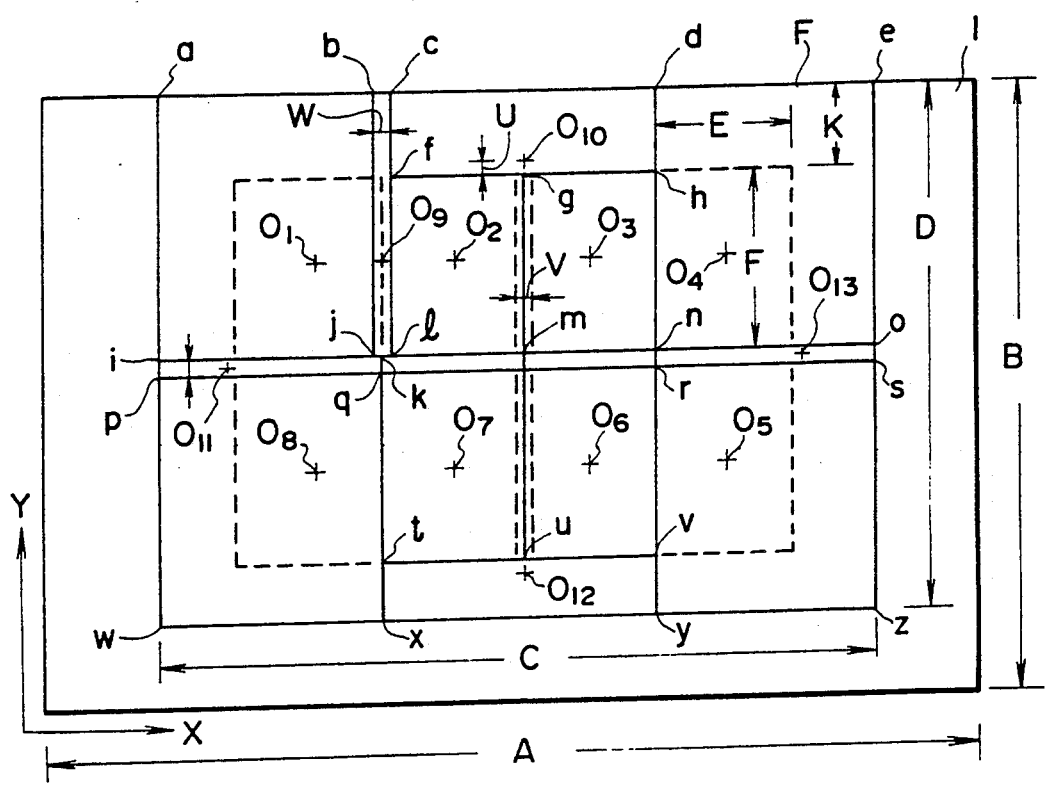
FIG. 10 is a front elevational view of a platen and a photosensitive medium, illustrating the manner in which images are successively photographed according to the format show in FIG. 9.

FIG. 10 shows the positions of a platen and exposure ranges in the respective photographing cycles when pages are to be imposed according to the format of FIG. 9. In the first photographing cycle, the point $O_1$ on the platen 1 is aligned with the optical axis, and the mask plates are displaced to adjust the positions of their edges, after which a rectangular range defined by points a, b, j, i is exposed.

In the second photographing cycle, the point $O_4$ on the platen 1 is aligned with the optical axis, and the mask plates are displaced to adjust the positions of their edges, after which a rectangular range defined by points d, e, o, n is exposed.

In the third photographing cycle, the point $O_5$ on the platen 1 is aligned with the optical axis, and the mask plates are displaced to adjust the positions of their edges, after which a rectangular range defined by points r, s, z, y is exposed.

In the fourth photographing cycle, the point $O_6$ on the platen 1 is aligned with the optical axis, and the mask plates are displaced to adjust the positions of their edges, after which a rectangular range defined by points p, q, x, w is exposed.

In the fifth photographing cycle, the point $O_7$ on the platen 1 is aligned with the optical axis, and the mask plates are displaced to adjust the positions of their edges, after which a rectangular range defined by points k, m, u, t is exposed.

In the sixth photographing cycle, the point $O_8$ on the platen 1 is aligned with the optical axis, and the mask plates are displaced to adjust the positions of their edges, after which a rectangular range defined by points m, n, v, u is exposed.

In the seventh photographing cycle, the point $O_3$ on the platen 1 is aligned with the optical axis, and the mask plates are displaced to adjust the positions of their edges, after which a rectangular range defined by points g, h, n, m is exposed.

In the eighth photographing cycle, the point $O_2$ on the platen 1 is aligned with the optical axis, and the mask plates are displaced to adjust the positions of their edges, after which a rectangular range defined by points f, g, m, l is exposed.

In the ninth photographing cycle, the point $O_9$ on the platen 1 is aligned with the optical axis, and the mask plates are displaced to adjust the positions of their edges, after which a rectangular range defined by points b, c, l, j is exposed.

In the tenth photographing cycle, the point $O_{10}$ on the platen 1 is aligned with the optical axis, and the mask plates are displaced to adjust the positions of their edges, after which a rectangular range defined by points c, d, h, f is exposed.

In the eleventh photographing cycle, the point $O_{11}$ on the platen 1 is aligned with the optical axis, and the mask plates are displaced to adjust the positions of their edges, after which a rectangular range defined by points i, k, q, p is exposed.

In the twelfth photographing cycle, the point $O_{12}$ on the platen 1 is aligned with the optical axis, and the mask plates are displaced to adjust the positions of their edges, after which a rectangular range defined by points t, v, y, x is exposed.

In the thirteenth photographing cycle, the point $O_{13}$ on the platen 1 is aligned with the optical axis, and the mask plates are displaced to adjust the positions of their edges, after which a rectangular range defined by points n, o, s, r is exposed.

The eight pages of text are photographed in the first through eight photographing cycles, back signatures are photographed in the ninth photographing cycle, and register marks are photographed in the tenth through thirteenth photographing cycles. A register mark is in the form of a crisscross mark. If a crisscross register mark is to be photographed in alignment with the optical axis, then a copy carrying the register mark may be placed in alignment with the optical axis on the copyboard, and it is not necessary to move the register mark copy each time it is photographed.

If edges of the platen 1 are regarded as the coordinate axes X, Y, and if it is assumed that the size of the platen 1: A (horizontal) × B (vertical),
the size of the photosensitive medium: C (horizontal) × D (vertical),
the size of each page: E (horizontal) × F (vertical),
the length of the gripper margin: K,
the width of the page-to-page space: V, and
the width of the back signature: W.

When the distance from the text to the register mark is U, the coordinates of the points $O_1$, $O_2$, ... $O_{13}$ and the distances from the optical axis to the edges of the mask plates are indicated in Table 1. In Table 1, $$1 - \frac{M_1}{(1 + n)f} \text{ is replaced with } Z_1,$$

$$1 - \frac{M_2}{(1 + n)f} \text{ is replaced with } Z_2,$$

$$1 - \frac{M_3}{(1 + n)f} \text{ is replaced with } Z_3, \text{ and}$$

$$1 - \frac{M_4}{(1 + n)f} \text{ is replaced with } Z_4.$$

TABLE 1

| | COORDINATES OF PLATEN | | $0 <$ DISTANCES FROM OPTICAL AXIS TO MASK PLATE $< 1$ | | | |
|---|---|---|---|---|---|---|
| | X COORDINATE | Y COORDINATE | $S_1$ $H_1 \times Z_1$ | $S_2$ $H_2 \times Z_2$ | $S_3$ $H_3 \times Z_3$ | $S_4$ $H_4 \times Z_4$ |
| $O_1$ | $\frac{A}{2} - \frac{V}{2} - 1.5E$ | $B - K - \frac{F}{2}$ | $\left(\frac{E}{2} - \frac{W}{2}\right)Z_1$ | $\left(\frac{C}{2} - \frac{V}{2} - 1.5E\right)Z_2$ | $\frac{F}{2} \times Z_3$ | $\left(K + \frac{F}{2}\right)Z_4$ |
| $O_2$ | $\frac{A}{2} - \frac{V}{2} - \frac{E}{2}$ | $B - K - \frac{F}{2}$ | $\left(\frac{E}{2} - \frac{V}{2}\right)Z_1$ | $\left(\frac{E}{2} - \frac{W}{2}\right)Z_2$ | $\frac{F}{2} \times Z_3$ | $\left(K + \frac{F}{2}\right)Z_4$ |
| $O_3$ | $\frac{A}{2} - \frac{V}{2} + \frac{E}{2}$ | $B - K - \frac{F}{2}$ | $\frac{E}{2} \times Z_1$ | $\left(\frac{E}{2} + \frac{V}{2}\right)Z_2$ | $\frac{F}{2} \times Z_3$ | $\left(K + \frac{F}{2}\right)Z_4$ |
| $O_4$ | $\frac{A}{2} + \frac{V}{2} + 1.5E$ | $B - K - \frac{F}{2}$ | $\left(\frac{C}{2} - \frac{V}{2} - 1.5E\right)Z_1$ | $\frac{E}{2} \times Z_2$ | $\frac{F}{2} \times Z_3$ | $\left(K + \frac{F}{2}\right)Z_4$ |
| $O_5$ | $\frac{A}{2} + \frac{V}{2} + 1.5E$ | $B - K - V - F$ | $\left(\frac{C}{2} - \frac{V}{2} - 1.5E\right)Z_1$ | $\left(\frac{1}{2} + \frac{V}{2}\right)Z_2$ | $(D - K - 1.5F - V)Z_3$ | $\frac{F}{2} \times Z_4$ |
| $O_6$ | $\frac{A}{2} + \frac{V}{2} + \frac{E}{2}$ | $B - K - V - F$ | $\frac{E}{2} \times Z_1$ | $\frac{E}{2} \times Z_2$ | $\frac{F}{2} \times Z_3$ | $\left(\frac{F}{2} + V\right)Z_4$ |
| $O_7$ | $\frac{A}{2} - \frac{V}{2} - \frac{E}{2}$ | $B - K - V - F$ | $\left(\frac{E}{2} + \frac{V}{2}\right)Z_1$ | $\frac{E}{2} \times Z_2$ | $\frac{F}{2} \times Z_3$ | $\left(\frac{F}{2} + V\right)Z_4$ |
| $O_8$ | $\frac{A}{2} - \frac{V}{2} - 1.5E$ | $B - K - V - F$ | $\frac{E}{2} \times Z_1$ | $\left(\frac{C}{2} - \frac{V}{2} - 1.5E\right)Z_2$ | $(D - K - 1.5F - V)Z_3$ | $\left(K + \frac{F}{2}\right)Z_4$ |
| $O_9$ | $\frac{A}{2} - E - \frac{W}{2}$ | $B - K - \frac{F}{2}$ | $\frac{W}{2} \times Z_1$ | $\frac{W}{2} \times Z_2$ | $\frac{F}{2} \times Z_3$ | $\frac{F}{2} \times Z_4$ |
| $O_{10}$ | $\frac{A}{2}$ | $B - K + U$ | $(U + E)Z_1$ | $\left(E - \frac{W}{2}\right)Z_2$ | $U \times Z_3$ | $(K - U)Z_4$ |
| $O_{11}$ | $\frac{A}{2} - 2E - U$ | $B - K - F - \frac{V}{2}$ | $\left(\frac{V}{2} + E\right)Z_1$ | $\left(\frac{C}{2} - \frac{V}{2} - 2E - U\right)Z_2$ | $\frac{V}{2} \times Z_3$ | $\frac{V}{2} \times Z_4$ |

TABLE 1-continued

| | COORDINATES OF PLATEN | | $0 <$ DISTANCES FROM OPTICAL AXIS TO MASK PLATE $< 1$ | | | |
|---|---|---|---|---|---|---|
| | X COORDINATE | Y COORDINATE | $S_1$ $H_1 \times Z_1$ | $S_2$ $H_2 \times Z_2$ | $S_3$ $H_3 \times Z_3$ | $S_4$ $H_4 \times Z_4$ |
| $O_{12}$ | $\frac{A}{2}$ | $B - K - V - 2F - U$ | $\left(\frac{V}{2} + E\right) Z_1$ | $\left(\frac{V}{2} - E\right) Z_2$ | $(D - K - 2F - V - U) Z_3$ | $U \times Z_4$ |
| $O_{13}$ | $\frac{A}{2} + \frac{V}{2} + 2E + U$ | $B - K - F - \frac{V}{2}$ | $\left(\frac{C}{2} - \frac{V}{2} - 2E - U\right) Z_1$ | $(U + E) Z_2$ | $\frac{V}{2} \times Z_3$ | $\frac{V}{2} \times Z_4$ |

WHERE
$z_1 = 1 - \frac{M_1}{(1 + n)f}$, $z_2 = 1 - \frac{M_2}{(1 + n)f}$
$z_3 = 1 - \frac{M_3}{(1 + n)f}$, $z_4 = 1 - \frac{M_4}{(1 + n)f}$ In this manner, the equations for calculating the positions of centers of respective images and the distances from the optical axis to the edges of the mask plates are determined depending on imposing formats, and listed in a table which is stored in a computer. Then, various input data such as photographing dimensions, the distances between a photosensitive medium and the mask plates, the photographing magnification, and the focal length of the focusing lens are put in the equations for each image to be photographed to calculate the distances from the optical axis of the focusing lens to the mask plates. The mask plates are then positioned according to the calculated distances, and the desired images are successively photographed in ranges defined by the mask plates thus positioned. The photosensitive medium can therefore be exposed in its entirety to the images. If the photosensitive medium thus exposed is used as a direct press plate, then it can be used as a printing plate. If the photosensitive medium is used as a negative film, it can be used to print a printing plate without a mask.

The format shown in FIG. 10 and Table 1 above are given by way of example only. Various other formats and tables of corresponding equations can also be used to photograph images on photosensitive mediums.

Although certain preferred embodiments have been shown and described, it should be understood that many changes and modifications may be made therein without departing from the scope of the appended claims.

I claim:

1. A process camera comprising:
   a horizontal copyboard for placing a copy thereon;
   a horizontal platen for supporting a photosensitive medium thereon, said platen being movable in a plane parallel to a surface thereof on which the photosensitive medium can be supported and along two axes perpendicular to each other;
   two pairs of mask plates disposed in front of and parallel to said surface of the platen, one pair of said mask plates being independently movable along one of said two axes which are perpendicular to each other, while the other pair of said mask plates are independently movable along the other axis;
   a mirror disposed above said copyboard for laterally reflecting light from the copyboard;
   a focusing lens disposed in an optical path along which the light reflected by said mirror travels;
   a movable mirror disposed above said platen and movable into and out of the optical axis of said focusing lens, said movable mirror being capable of bending the optical axis of said focusing lens toward said platen when the movable mirror is moved into the optical axis of said focusing lens;
   an index plate positioned on the optical axis of said focusing mirror when said movable mirror is moved out of said optical axis, said index plate being disposed in conjugate relation to said platen; and
   means for photographing images of text and outside page information marks for pagenation on the photosensitive medium on said platen in a predetermined sequence while moving said platen and said mask plates.

2. A process camera according to claim 1, wherein an optical path extending from the mirror disposed above said copyboard through said focusing lens and said movable mirror to said index plate is inclined such that said mirror above said copyboard is positioned higher than said movable mirror.

3. A process camera according to claim 1, wherein said platen is movable in said plane parallel to said surface thereof on which the photosensitive medium can be supported and in X and Y directions extending perpendicularly to each other.

4. A process camera according to claim 1, wherein said platen has a suction device for attracting the photosensitive medium supported thereon.

5. A process camera according to claim 1, further including a feed screw for moving said focusing lens along the optical axis thereof.

6. A process camera comprising:
   a platen for supporting a photosensitive medium, said platen being movable in a plane parallel to a surface thereof on which the photosensitive medium can be supported and along two axes perpendicular to each other;
   a focusing lens for focusing images onto the photosensitive medium supported on said platen;
   two pairs of mask plates disposed in front of and parallel to said surface of the platen, said mask plates being independently movable along said two axes;
   means for photographing images of text and outside-page information marks on the photosensitive medium on said platen in a predetermined sequence while moving said platen and said mask plates;
   said mask plates being spaced from said platen by different distances so that the mask plates will be kept out of physical interference with each other when independently moved; and
   means for calculating distances from the optical axis of said focusing lens to said mask plates for each of the images, based on input data including a photographing dimension, the distances between the photosensitive medium and the mask plates, a photographing magnification, and the focal length of said focusing lens, and for positioning said mask plates at the calculated distances from said optical axis.

* * * * *